(12) United States Patent
Zhang et al.

(10) Patent No.: US 12,549,276 B2
(45) Date of Patent: Feb. 10, 2026

(54) METHOD AND APPARATUS FOR MODULATION AND CODING SCHEME TABLE SWITCH

(71) Applicant: Telefonaktiebolaget LM Ericsson (publ), Stockholm (SE)

(72) Inventors: Qi Zhang, Beijing (CN); Xiaomeng Liu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 313 days.

(21) Appl. No.: 18/274,529

(22) PCT Filed: Jan. 29, 2021

(86) PCT No.: PCT/CN2021/074448
§ 371 (c)(1),
(2) Date: Jul. 27, 2023

(87) PCT Pub. No.: WO2022/160262
PCT Pub. Date: Aug. 4, 2022

(65) Prior Publication Data
US 2024/0121025 A1 Apr. 11, 2024

(51) Int. Cl.
*H04L 1/00* (2006.01)
*H04W 52/36* (2009.01)

(52) U.S. Cl.
CPC .......... *H04L 1/0009* (2013.01); *H04L 1/0003* (2013.01); *H04L 1/0016* (2013.01); *H04W 52/367* (2013.01)

(58) Field of Classification Search
CPC ... H04L 1/0009; H04L 1/0003; H04L 1/0016; H04W 52/367
See application file for complete search history.

(56) References Cited

U.S. PATENT DOCUMENTS

| | | | | |
|---|---|---|---|---|
| 7,369,856 | B2* | 5/2008 | Ovadia | H04W 36/38 455/442 |
| 9,419,772 | B2* | 8/2016 | Kim | H04L 27/36 |
| 11,528,086 | B2* | 12/2022 | Venugopal | H04L 1/0016 |
| 2012/0052898 | A1* | 3/2012 | Hegge | H04W 74/04 455/511 |

(Continued)

OTHER PUBLICATIONS

International Search Report and Written Opinion issued in International Application No. PCT/CN2021/074448 dated Nov. 4, 2021 (8 pages).

(Continued)

*Primary Examiner* — Khaled M Kassim
(74) *Attorney, Agent, or Firm* — Weisberg I.P. Law, P.A.

(57) ABSTRACT

Embodiments of the present disclosure provide method and apparatus for MCS table switch. A method performed by a network device comprises determining that a terminal device supports a first modulation and coding scheme (MCS) and a second MCS. The method further comprises transmitting configuration information regarding a first bandwidth part associated with a first MCS table supporting the first MCS to the terminal device. The method further comprises transmitting configuration information regarding a second bandwidth part associated with a second MCS table supporting the second MCS to the terminal device. The first MCS table is different from the second MCS table.

14 Claims, 14 Drawing Sheets

(56) References Cited

U.S. PATENT DOCUMENTS

| | | | | |
|---|---|---|---|---|
| 2014/0295849 | A1* | 10/2014 | Sirotkin | H04W 36/0022 |
| | | | | 455/437 |
| 2015/0085767 | A1* | 3/2015 | Einhaus | H04L 5/003 |
| | | | | 370/329 |
| 2016/0323087 | A1* | 11/2016 | Kim | H04L 1/0003 |
| 2018/0288711 | A1* | 10/2018 | Lagerqvist | H04W 52/143 |
| 2019/0174369 | A1* | 6/2019 | Tomikawa | H04W 36/12 |
| 2019/0238257 | A1* | 8/2019 | Hosseini | H04L 1/0016 |
| 2019/0253121 | A1* | 8/2019 | Islam | H04L 1/0016 |
| 2019/0313411 | A1* | 10/2019 | Ly | H04W 72/0453 |
| 2019/0386770 | A1* | 12/2019 | Wei | H04L 1/0061 |
| 2020/0037191 | A1* | 1/2020 | Jang | H04L 1/1861 |
| 2020/0328864 | A1* | 10/2020 | Choi | H04L 5/0098 |
| 2020/0328865 | A1* | 10/2020 | Choi | H04W 72/0453 |
| 2020/0374911 | A1 | 11/2020 | Lee et al. | |
| 2020/0404690 | A1* | 12/2020 | Lee | H04L 5/001 |
| 2021/0259005 | A1* | 8/2021 | Yoshioka | H04L 27/2602 |
| 2021/0345148 | A1* | 11/2021 | Lin | H04L 5/0098 |
| 2021/0385013 | A1* | 12/2021 | Berger | H04L 5/003 |
| 2021/0392467 | A1* | 12/2021 | Kim | H04W 76/40 |
| 2022/0158753 | A1* | 5/2022 | Hwang | H04W 4/40 |

OTHER PUBLICATIONS

Broadcom Corporation, "Details of MCS and TBS design for high order modulation", 3GPP TSG-RAN WG1 Meeting #76, R1-140608, Prague, Czech Republic, Feb. 10-14, 2014 (5 pages).

InterDigital Inc., "CQI and MCS Tables for NR URLLC", 3GPP TSG RAN WG1 Meeting #93, R1-1807018, Busan, Korea, May 21-25, 2018 (10 pages).

LG Electronics, "Further details on 256QAM operation", 3GPP TSG RAN WG1 Meeting #76bis, R1-141338, Shenzhen, China, Mar. 31-Apr. 4, 2014 (6 pages).

Intel Corporation, "Support of 64QAM for LTE V2V sidelink communication", 3GPP TSG RAN WG1 Meeting #91 R1-1720033, Reno, USA, Nov. 27-Dec. 1, 2017 (8 pages).

3GPP TS 38.331 V15.6.0 (Jun. 2019), 3rd Generation Partnership Project; Technical Specification Group Radio Access Network; NR; Radio Resource Control (RRC) protocol specification (Release 15), Jun. 2019 (519 pages).

EPO Communication with Extended European Search Report dated Dec. 23, 2024 for Patent Application No. 21921867.4, consisting of 16 pages.

* cited by examiner

420 ─┐

┌─ 422
│ Determining channel quality between the network device and the terminal device ┌─ 424
│ Transmitting a command to the terminal device to switch to the first bandwidth part or the second bandwidth part based on the channel quality between the network device and the terminal device

┌─ 502
│ Receiving configuration information regarding a first bandwidth part associated with a first modulation and coding scheme, MCS, table supporting the first MCS from the network device ┌─ 504
│ Receiving configuration information regarding a second bandwidth part associated with a second MCS table supporting the second MCS from the network device, wherein the first MCS table is different from the second MCS table

Receiving a command from the network device to switch to the first bandwidth part or the second bandwidth part

604

Switching to the first bandwidth part or the second bandwidth part based on the command

METHOD AND APPARATUS FOR MODULATION AND CODING SCHEME TABLE SWITCH

CROSS-REFERENCE TO RELATED APPLICATIONS

This application is a 35 U.S.C. § 371 National Stage of International Patent Application No. PCT/CN2021/074448, filed 2021 Jan. 29.

TECHNICAL FIELD

The non-limiting and exemplary embodiments of the present disclosure generally relate to the technical field of communications, and specifically to methods and apparatuses for modulation and coding scheme (MCS) table switch.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance With the rapid development of networking and communication technologies, wireless communication networks such as long-term evolution (LTE)/fourth generation (4G) network and new radio (NR)/fifth generation (5G) network are expected to achieve high traffic capacity and end-user data rate with lower latency. To meet the diverse requirements of new services across a wide variety of industries, the 3rd generation partnership project (3GPP) is developing various network function services for various communication networks.

3GPP NR supports very large operating bandwidths relative to the previous generations of 3GPP standards. Since UEs (user equipments) in a cell may have different bandwidth capabilities, the use of wide bandwidth may cause more power consumption and may increase RF (radio frequency) and baseband implementation complexity. Therefore, NR introduces a concept of Bandwidth Part (BWP) and allows the UEs with different bandwidth capabilities to operate in the cell with smaller instantaneous bandwidth relative to the configured cell bandwidth, which makes NR as an more energy efficient solution despite its support of wideband channels.

A BWP may be a contiguous set of physical resource blocks (PRBs) on a given carrier. These PRBs may be selected from a contiguous subset of the common resource blocks for a given numerology. Each BWP defined for a numerology can have some parameters such as subcarrier spacing, symbol duration, cyclic prefix (CP) length, etc.

FIG. 1 shows an example of use cases of the BWP according to an embodiment of the disclosure. For example, the BWP supports reduced UE/network BW (bandwidth). The BWP supports bandwidth adaptation. The BWP supports semi-dynamic configuration switch. The BWP supports mixed numerology. The BWP supports non-contiguous spectrum.

For each serving cell, up to 4 downlink/uplink (DL/UL) BWPs can be configured separately and independently for paired spectrum. Nevertheless, only one BWP can be active at a given time and the UE is not expected to receive downlink/uplink physical signals/channels outside of an active BWP. For paired spectrum, a downlink BWP and an uplink BWP are jointly configured as a pair and up to four pairs can be configured.

According to clause 5.15 of 3GPP TS 38.321 V16.3.0, the disclosure of which is incorporated by reference herein in its entirety, 3GPP supports several types of BWP switching, such as RA (random access) based BWP switching, DCI (Downlink Control Information) based BWP switching, timer based BWP switching, RRC (Radio Resource Control) based BWP switching, etc. The BWP switching for a serving Cell is used to activate an inactive BWP and deactivate an active BWP at a time. The BWP switching is controlled by the PDCCH (Physical Downlink Control Channel) indicating a downlink assignment or an uplink grant, by the bwp-InactivityTimer, by RRC signalling, or by the MAC entity itself upon initiation of Random Access procedure or upon detection of consistent LBT (Listen Before Talk) failure on SpCell (Special Cell). Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to clause 6.2.2 of 3GPP TS 38.101-1 V17.0.0, the disclosure of which is incorporated by reference herein in its entirety, UE is allowed to reduce the maximum output power for example due to higher order modulations and transmit bandwidth configurations. Maximum power reduction (MPR) is defined for different power class. Generally, 256 QAM (Quadrature Amplitude Modulation) have larger range of MPR. And it's up to UE to determine how much the MPR should be. The network device such as next generation NodeB (gNodeB or gNB) can get the value of MPR according to Pcmax which means max power after power reduction sent in PHR (Power Headroom Report).

Table 1 shows maximum power reduction (MPR) for power class 3 which is same as Table 6.2.2-1 of 3GPP TS 38.101-1 V17.0.0.

TABLE 1

| | | MPR (dB) | | |
|---|---|---|---|---|
| Modulation | | Edge RB allocations | Outer RB allocations | Inner RB allocations |
| DFT-s-OFDM | Pi/2 BPSK | ≤3.5[1] | ≤1.2[1] | ≤0.2[1] |
| | BPSK | ≤0.5[2] | ≤0.5[2] | 0[2] |
| | QPSK | | ≤1 | 0 |
| | 16 QAM | | ≤2 | ≤1 |
| | 64 QAM | | ≤2.5 | |
| | 256 QAM | | ≤4.5 | |

TABLE 1-continued

| Modulation | | Edge RB allocations | Outer RB allocations | Inner RB allocations |
|---|---|---|---|---|
| | | MPR (dB) | | |
| CP-OFDM | QPSK | ≤3 | | ≤1.5 |
| | 16 QAM | ≤3 | | ≤2 |
| | 64 QAM | | ≤3.5 | |
| | 256 QAM | | ≤6.5 | |

NOTE 1:
Applicable for UE operating in TDD mode with Pi/2 BPSK modulation and UE indicates support for UE capability powerBoosting-pi2BPSK and if the IE powerBoostPi2BPSK is set to 1 and 40% or less slots in radio frame are used for UL transmission for bands n40, n41, n77, n78 and n79. The reference power of 0 dB MPR is 26 dBm.
NOTE 2:
Applicable for UE operating in FDD mode, or in TDD mode in bands other than n40, n41, n77, n78 and n79 with Pi/2 BPSK modulation and if the IE powerBoostPi2BPSK is set to 0 and if more than 40% of slots in radio frame are used for UL transmission for bands n40, n41, n77, n78 and n79.

Table 2 shows maximum power reduction (MPR) for power class 2 which is same as Table 6.2.2-2 of 3GPP TS 38.101-1 V17.0.0.

TABLE 2

| Modulation | | Edge RB allocations | Outer RB allocations | Inner RB allocations |
|---|---|---|---|---|
| | | MPR (dB) | | |
| DFT-s-OFDM | Pi/2 BPSK | ≤3.5 | ≤0.5 | 0 |
| | QPSK | ≤3.5 | ≤1 | 0 |
| | 16 QAM | ≤3.5 | ≤2 | ≤1 |
| | 64 QAM | ≤3.5 | | ≤2.5 |
| | 256 QAM | | ≤4.5 | |
| CP-OFDM | QPSK | ≤3.5 | ≤3 | ≤1.5 |
| | 16 QAM | ≤3.5 | ≤3 | ≤2 |
| | 64 QAM | | ≤3.5 | |
| | 256 QAM | | ≤6.5 | |

Table 3 shows MCS index table 1 for PDSCH (physical downlink shared channel) which is same as Table 5.1.3.1-1 of 3GPP TS 38.214 V16.4.0, the disclosure of which is incorporated by reference herein in its entirety.

TABLE 3

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

Table 4 shows MCS index table 2 for PDSCH which is same as Table 5.1.3.1-2 of 3GPP TS 38.214 V16.4.0.

TABLE 4

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

Comparing MCS index 27/28 in Table 3 with MCS 20/21 in Table 4, they have same spectral efficiency but with different modulation orders. Normally, better channel quality is required to support larger modulation order with same spectral efficiency. However, according to MPR, UE may reduce larger power for larger modulation order. This would cause performance loss for certain path loss by using Table 4.

FIG. 2 shows an simulation result of Table 3 and Table 4 according to an embodiment of the disclosure. SSB denotes Synchronization Signal and PBCH (Physical Broadcast Channel) block. RSRP denotes Reference Signal Received Power. Table 4 is represented by 256QAM (Quadrature Amplitude Modulation) table. Table 3 is represented by 64QAM table. As shown in FIG. 2, for gap area of the 256QAM table link curve and the 64QAM table link curve, PUSCH (Physical Uplink Shared Channel) transmission (Tx) power is 19.5 dBm for 256 QAM table, and PUSCH Tx power is 22.5 dBm for 64QAM table. When the UE reduces a larger power for larger modulation order such as 256

QAM, it may cause performance loss (such as throughput reduction) for the gap area by using Table 4.

To overcome or mitigate at least one of above mentioned problems or other problems, the embodiments of the present disclosure propose an improved solution for MCS table switch.

In a first aspect of the disclosure, there is provided a method performed by a network device. The method comprises determining that a terminal device supports a first modulation and coding scheme (MCS) and a second MCS. The method further comprises transmitting configuration information regarding a first bandwidth part associated with a first MCS table supporting the first MCS to the terminal device. The method further comprises transmitting configuration information regarding a second bandwidth part associated with a second MCS table supporting the second MCS to the terminal device. The first MCS table is different from the second MCS table.

In an embodiment, the method further comprises determining a power reduction value of the terminal device. The method further comprises, when the power reduction value of the terminal device is greater than the maximum power reduction value related to the first MCS and smaller than the maximum power reduction value related to the second MCS, determining the terminal device as a MCS table switch candidate. The method further comprises, when the power reduction value of the terminal device is not greater than the maximum power reduction value related to the first MCS, determining the terminal device as a non MCS table switch candidate.

In an embodiment, determining the power reduction value of the terminal device comprising obtaining a power class of the terminal device; obtaining a maximum transmitter power value configured to the terminal device; obtaining a maximum transmitter power value of the terminal device; and determining the power reduction value of the terminal device based on the power class of the terminal device, the maximum transmitter power value configured to the terminal device and the maximum transmitter power value of the terminal device.

In an embodiment, the method further comprises determining channel quality between the network device and the terminal device. The method further comprises transmitting a command to the terminal device to switch to the first bandwidth part or the second bandwidth part based on the channel quality between the network device and the terminal device.

In an embodiment, transmitting a command to the terminal device to switch to the first bandwidth part or the second bandwidth part based on the channel quality between the network device and the terminal device comprises determining that the terminal device is using the second MCS table; and when the channel quality between the network device and the terminal device falls into at least one first channel quality range that network performance using the first MCS table is higher than network performance using the second MCS table, transmitting the command to the terminal device to switch to the first bandwidth part.

In an embodiment, the at least one first channel quality range comprises at least one of: [a channel quality corresponding to the second MCS with a lowest spectral efficiency in the second MCS table, a channel quality corresponding to the second MCS with a second lowest spectral efficiency in the second MCS table], or [a channel quality corresponding to the first MCS with a highest spectral efficiency in the second MCS table, a channel quality corresponding to the second MCS with a third lowest spectral efficiency in the second MCS table].

In an embodiment, transmitting a command to the terminal device to switch to the first bandwidth part or the second bandwidth part based on the channel quality between the network device and the terminal device comprises determining that the terminal device is using the first MCS table; and when the channel quality between the network device and the terminal device falls into at least one second channel quality range that network performance using the second MCS table is higher than network performance using the first MCS table, transmitting a command to the terminal device to switch to the second bandwidth part.

In an embodiment, the at least one second channel quality range comprises at least one of [a channel quality corresponding to the first MCS with a highest spectral efficiency in the first MCS table, infinity]; or [a channel quality corresponding to the first MCS with a second highest spectral efficiency in the first MCS table, infinity].

In an embodiment, the command is transmitted to the terminal device in at least one of downlink control information; medium access control (MAC) control element (CE); or a radio resource control message.

In an embodiment, the command is transmitted to the terminal device further based on a prohibition timer.

In an embodiment, the first MCS comprises 64 Quadrature Amplitude Modulation (QAM) and the second MCS comprises 256 QAM.

In a second aspect of the disclosure, there is provided a method performed by a terminal device. The method comprises receiving configuration information regarding a first bandwidth part associated with a first modulation and coding scheme (MCS) table supporting the first MCS from the network device. The method further comprises receiving configuration information regarding a second bandwidth part associated with a second MCS table supporting the second MCS from the network device. The first MCS table is different from the second MCS table.

In an embodiment, the method further comprises receiving a command from the network device to switch to the first bandwidth part or the second bandwidth part. The method further comprises switching to the first bandwidth part or the second bandwidth part based on the command.

In a third aspect of the disclosure, there is provided a network device. The network device comprises a processor; and a memory coupled to the processor, said memory containing instructions executable by said processor, whereby said network device is operative to determine that a terminal device supports a first modulation and coding scheme (MCS) and a second MCS. Said network device is further operative to transmit configuration information regarding a first bandwidth part associated with a first MCS table supporting the first MCS to the terminal device. Said network device is further operative to transmit configuration information regarding a second bandwidth part associated with the second MCS table supporting the second MCS to the terminal device. The first MCS table is different from the second MCS table.

In a fourth aspect of the disclosure, there is provided a terminal device. The terminal device comprises a processor; and a memory coupled to the processor, said memory containing instructions executable by said processor, whereby said terminal device is operative to receive configuration information regarding a first bandwidth part associated with a first MCS table supporting the first MCS from the network device. Said terminal device is further operative to receive configuration information regarding a second bandwidth part associated with a second MCS table supporting the second MCS from the network device. The first MCS table is different from the second MCS table.

In a fifth aspect of the disclosure, there is provided a network device. The network device comprises a first determining module, a first transmitting module and a second transmitting module. The first determining module may be configured to determine that a terminal device supports a first modulation and coding scheme (MCS) and a second MCS. The first transmitting module may be configured to transmit configuration information regarding a first bandwidth part associated with a first MCS table supporting the first MCS to the terminal device. The second transmitting module may be configured to transmit configuration information regarding a second bandwidth part associated with a second MCS table supporting the second MCS to the terminal device. The first MCS table is different from the second MCS table.

In an embodiment, the network device may further comprise a second determining module configured to determine a power reduction value of the terminal device.

In an embodiment, the network device may further comprise a third determining module configured to determine the terminal device as a MCS table switch candidate when the power reduction value of the terminal device is greater than the maximum power reduction value related to the first MCS and smaller than the maximum power reduction value related to the second MCS.

In an embodiment, the network device may further comprise a fourth determining module configured to determine the terminal device as a non MCS table switch candidate when the power reduction value of the terminal device is not greater than the maximum power reduction value related to the first MCS.

In an embodiment, the network device may further comprise a fifth determining module configured to determine channel quality between the network device and the terminal device.

In an embodiment, the network device may further comprise a third transmitting module configured to transmit a command to the terminal device to switch to the first bandwidth part or the second bandwidth part based on the channel quality between the network device and the terminal device.

In a sixth aspect of the disclosure, there is provided a terminal device. The terminal device comprises a first receiving module and a second receiving module. The first receiving module may be configured to receive configuration information regarding a first bandwidth part associated with a first modulation and coding scheme (MCS) table supporting the first MCS from the network device. The second receiving module may be configured to receive configuration information regarding a second bandwidth part associated with a second MCS table supporting the second MCS from the network device. The first MCS table is different from the second MCS table.

In an embodiment, the terminal device may further comprise a third receiving module configured to receive a command from the network device to switch to the first bandwidth part or the second bandwidth part.

In an embodiment, the terminal device may further comprise a switching module configured to switch to the first bandwidth part or the second bandwidth part based on the command.

In a seventh aspect of the disclosure, there is provided a computer program product comprising instructions which when executed by at least one processor, cause the at least one processor to perform the method according to any one of the first and second aspects.

In an eighth aspect of the disclosure, there is provided a computer-readable storage medium storing instructions which when executed by at least one processor, cause the at least one processor to perform the method according to any one of the first and second aspects.

In another aspect of the disclosure, there is provided a communication system including a host computer including: processing circuitry configured to provide user data; and a communication interface configured to forward the user data to a cellular network for transmission to a terminal device. The cellular network includes the network device above mentioned, and/or the terminal device above mentioned.

In embodiments of the present disclosure, the system further includes the terminal device, wherein the terminal device is configured to communicate with the network device.

In embodiments of the present disclosure, the processing circuitry of the host computer is configured to execute a host application, thereby providing the user data; and the terminal device includes processing circuitry configured to execute a client application associated with the host application.

In another aspect of the disclosure, there is provided a communication system including a host computer including: a communication interface configured to receive user data originating from a transmission from a terminal device; a network device. The transmission is from the terminal device to the network device. The network device is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

In another aspect of the disclosure, there is provided a method implemented in a communication system which may include a host computer, a network device and a terminal device. The method may comprise providing user data at the host computer. Optionally, the method may comprise, at the host computer, initiating a transmission carrying the user data to the terminal device via a cellular network comprising the network device which may perform any step of the method according to the first aspect of the present disclosure.

In another aspect of the disclosure, there is provided a communication system including a host computer. The host computer may comprise processing circuitry configured to provide user data, and a communication interface configured to forward the user data to a cellular network for transmission to a terminal device. The cellular network may comprise a network device having a radio interface and processing circuitry. The network device's processing circuitry may be configured to perform any step of the method according to the first aspect of the present disclosure.

In another aspect of the disclosure, there is provided a method implemented in a communication system which may include a host computer, a network device and a terminal device. The method may comprise providing user data at the host computer. Optionally, the method may comprise, at the host computer, initiating a transmission carrying the user data to the terminal device via a cellular network comprising the network device. The terminal device may perform any step of the method according to the second aspect of the present disclosure.

In another aspect of the disclosure, there is provided a communication system including a host computer. The host computer may comprise processing circuitry configured to provide user data, and a communication interface configured to forward user data to a cellular network for transmission to a terminal device. The terminal device may comprise a radio interface and processing circuitry. The terminal device's processing circuitry may be configured to perform any step of the method according to the second aspect of the present disclosure.

In another aspect of the disclosure, there is provided a method implemented in a communication system which may include a host computer, a network device and a terminal device. The method may comprise, at the host computer, receiving user data transmitted to the network device from the terminal device which may perform any step of the method according to the second aspect of the present disclosure.

In another aspect of the disclosure, there is provided a communication system including a host computer. The host computer may comprise a communication interface configured to receive user data originating from a transmission from a terminal device to a network device. The terminal device may comprise a radio interface and processing circuitry. The terminal device's processing circuitry may be configured to perform any step of the method according to the second aspect of the present disclosure.

In another aspect of the disclosure, there is provided a method implemented in a communication system which may include a host computer, a network device and a terminal device. The method may comprise, at the host computer, receiving, from the network device, user data originating from a transmission which the network device has received from the terminal device. The network device may perform any step of the method according to the first aspect of the present disclosure.

In another aspect of the disclosure, there is provided a communication system which may include a host computer. The host computer may comprise a communication interface configured to receive user data originating from a transmission from a terminal device to a network device. The network device may comprise a radio interface and processing circuitry. The network device's processing circuitry may be configured to perform any step of the method according to the first aspect of the present disclosure.

Embodiments herein may provide many advantages, of which a non-exhaustive list of examples follows. In some embodiments herein, network throughput may be improved by MCS table switching. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 4c shows a flowchart of a method according to another embodiment of the present disclosure;

FIG. 5 shows a flowchart of a method according to another embodiment of the present disclosure;

DETAILED DESCRIPTION

Figure 1:
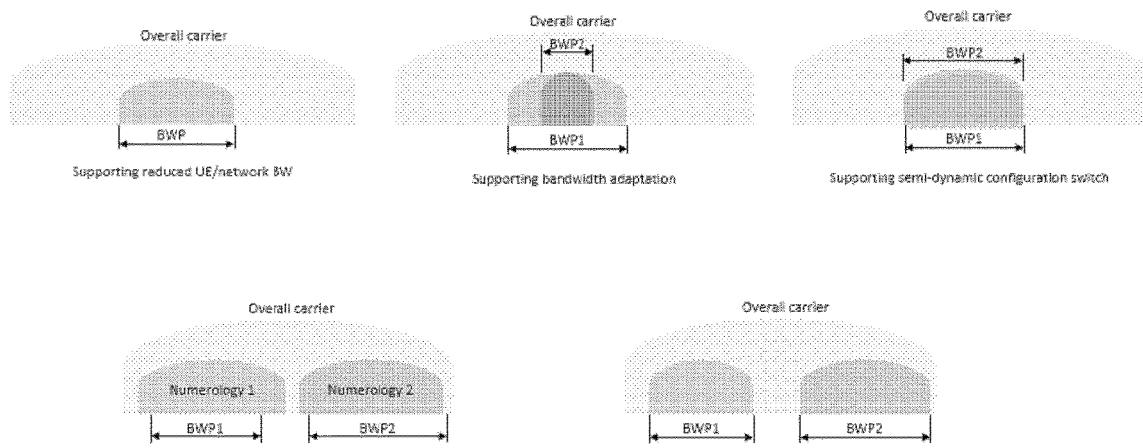
FIG. 1 shows an example of use cases of the BWP according to an embodiment of the disclosure.
Figure 2:
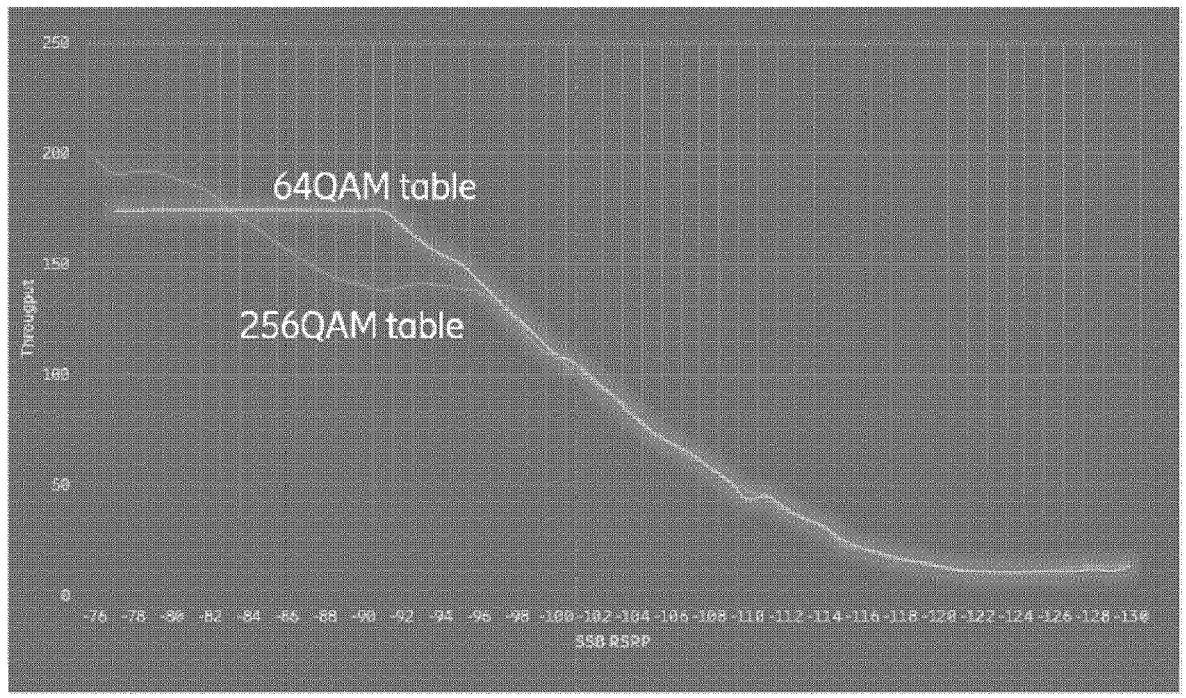
FIG. 2 shows an simulation result of Table 3 and Table 4 according to an embodiment of the disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols may comprise the first generation (1G), 2G, 3G, 4G, 4.5G, 5G communication protocols, and/or any other protocols either currently known or to be developed in the future.

The term "network device" refers to any suitable network function (NF) which can be implemented in a network entity (physical or virtual) of a communication network. For example, the network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), NSSF (Network Slice Selection Function), NSSAAF (Network Slice-Specific Authentication and Authorization Function), etc. For example, the 4G system (such as LTE) may include MME (Mobile Management Entity), HSS (home subscriber server), Policy and Charging Rules Function (PCRF), Packet Data Network Gateway (PGW), PGW control plane (PGW-C), Serving gateway (SGW), SGW control plane (SGW-C), E-UTRAN Node B (eNB), etc. In other embodiments, the network function may comprise different types of NFs for example depending on a specific network.

The network device may be an access network device with accessing function in a communication network via which a terminal device accesses to the network and receives services therefrom. The access network device may include a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), an Integrated Access and Backhaul (IAB) node, a remote radio head (RRH), a relay, a low power node such as a femto, a pico, and so forth.

Yet further examples of the access network device comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment.

The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Figure 3:
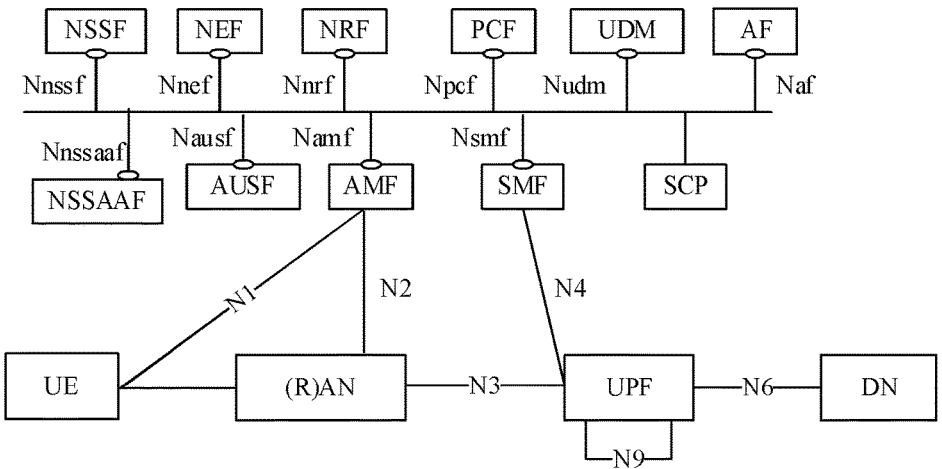
FIG. 3 schematically shows a high level architecture in the fifth generation network according to an embodiment of the present disclosure.

Although the subject matter described herein may be implemented in any appropriate type of system using any suitable components, the embodiments disclosed herein are described in relation to a communication system complied with the exemplary system architecture illustrated in FIG. 3. For simplicity, the system architecture of FIG. 3 only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 3 schematically shows a high level architecture in the fifth generation network according to an embodiment of the present disclosure. For example, the fifth generation network may be 5GS. The architecture of FIG. 3 is same as FIG. 4.2.3-1 as described in 3GPP TS 23.501 V16.7.0, the disclosure of which is incorporated by reference herein in its entirety. The system architecture of FIG. 3 may comprise some exemplary elements such as AUSF, AMF, DN (data network), NEF, NRF, NSSF, PCF, SMF, UDM, UPF, AF, UE, (R)AN, SCP (Service Communication Proxy), NSSAAF (Network Slice-Specific Authentication and Authorization Function), etc.

In accordance with an exemplary embodiment, the UE can establish a signaling connection with the AMF over the reference point N1, as illustrated in FIG. 3. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a protocol data unit (PDU) session to the DN (data network, e.g. an operator network or Internet) through the UPF over the reference point N6.

As further illustrated in FIG. 3, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 3 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 3 may be responsible for functions such as session management, mobility management, authentication, security, etc. The AUSF, AMF, DN, NEF, NRF, NSSF, PCF, SMF, UDM, UPF, AF, UE, (R)AN, SCP may include the functionality for example as defined in clause 6.2 of 3GPP TS23.501 V16.7.0.

Figure 4A:
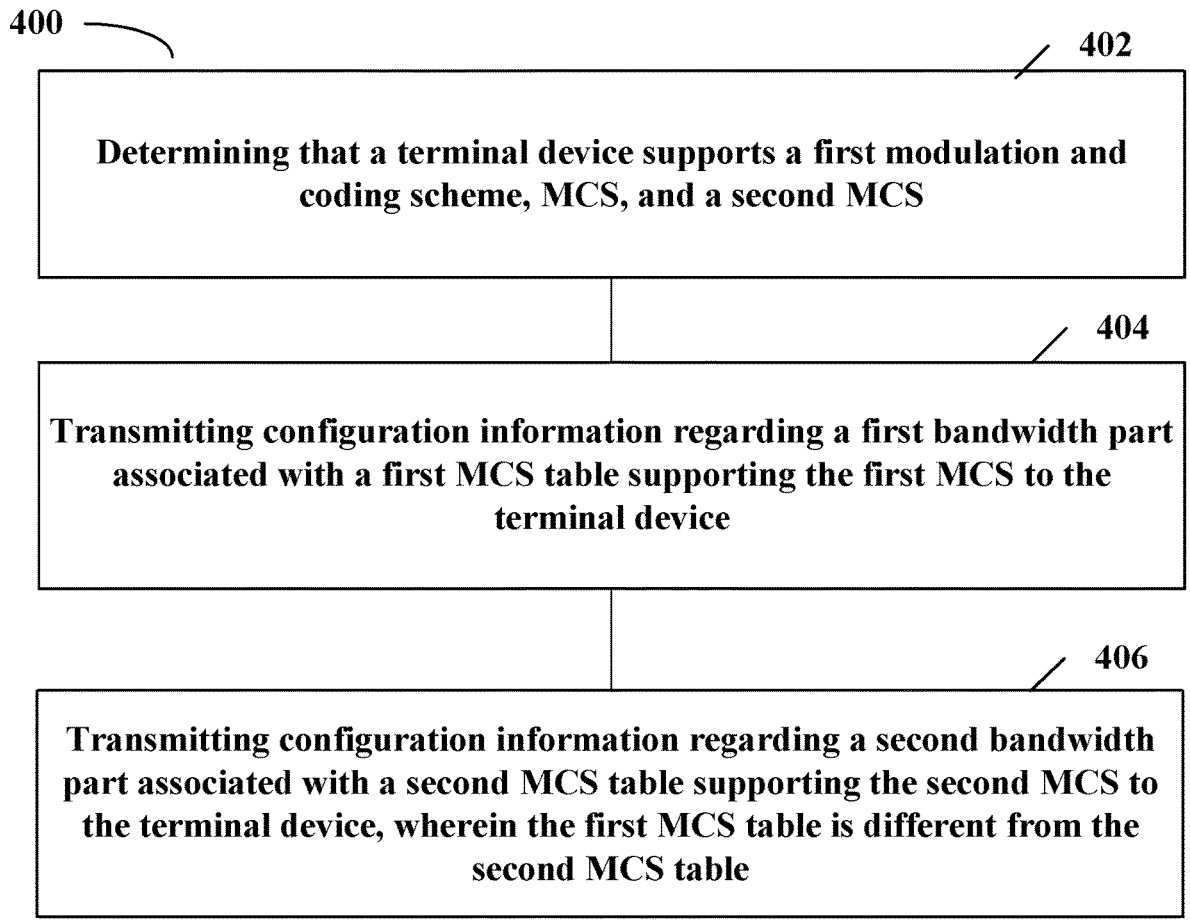
FIG. 4a shows a flowchart of a method according to an embodiment of the present disclosure.

FIG. 4a shows a flowchart of a method according to an embodiment of the present disclosure, which may be performed by an apparatus implemented in or at or as a network device or communicatively coupled to the network device. As such, the apparatus may provide means or modules for accomplishing various parts of the method 400 as well as means or modules for accomplishing other processes in conjunction with other components.

At block 402, the network device may determine that a terminal device supports a first modulation and coding scheme (MCS) and a second MCS. The first MCS may be any suitable MCS such as Pi/2 BPSK (Binary Phase Shift Keying), QPSK (Quadrature (Quaternary) Phase Shift Keying), 16 QAM, 64 QAM, 256 QAM, etc. The second MCS may be any suitable MCS such as Pi/2 BPSK, QPSK, 16 QAM, 64 QAM, 256 QAM, etc.

In an embodiment, the first MCS may comprise 64 QAM and the second MCS may comprise 256 QAM.

The network device may determine that the terminal device supports the first MCS and the second MCS in various ways. In an embodiment, the terminal device may report its MCS information in a capability report to the network device. As an example, according to clause 6.3.3 of 3GPP TS 38.331 V16.3.1, the disclosure of which is incorporated by reference herein in its entirety, UE capability information elements may be used to report the MCS information to the network device. For example,

| BandNR ::= | SEQUENCE { |
| pdsch-256QAM-FR2 OPTIONAL, | ENUMERATED {supported} |
| pusch-256QAM OPTIONAL} | ENUMERATED {supported} |

In this example, the terminal device reports to the network device that it support pdsch-256QAM-FR2 and pusch-256QAM. In general, it also means that the terminal device also supports other lower modulation order of MCS than 256QAM, such as 64 QAM, etc.

In an embodiment, the network device may determine that the terminal device supports the first MCS and the second ment, the second MCS table may be same as Table 5.1.3.1-2 of 3GPP TS 38.214 V16.4.0. The second MCS table can support higher spectral efficiency than the first MCS table. Hence, for UE in good wireless condition, higher throughput can be gotten by using the second MCS table. In addition, it's easy to find that the second MCS table has a larger step in low spectral efficiency, which may have a negative impact on network performance for a bad wireless condition. According to both ideal calculation and test result, this impact may be very limited. For example, from the table, the maximum spectral efficiency difference may be 0.1523. Assume TDD (Time Division Duplex) pattern DDDDDDD-SUU, bandwidth 100M, PRACH (Physical Random Access Channel) period 10 ms, 2 DMRS (Demodulation Reference Signal) symbols, maximum throughput difference is 0.1523*144*(271*300+259*100)=2.35 Mbps.

For example, the network device such as gNB may configure a MCS table supporting 256 QAM and a MCS table supporting 64 QAM to the terminal device such as UE when the UE have the capability of 256 QAM and 64 QAM in an initial BWP.

For example, according to clause 6.3.2 of 3GPP TS 38.331 V16.3.1, the network device may configure MCS table for BWP as below:

| BWP-Uplink ::= | SEQUENCE { |
| bwp-Id | BWP-Id, |
| bwp-Common | BWP-UplinkCommon |
| bwp-Dedicated | BWP-UplinkDedicated |
| BWP-UplinkDedicated ::= | SEQUENCE { |
| pusch-Config | SetupRelease { PUSCH-Config } |
| PUSCH-Config ::= | SEQUENCE { |
| mcs-Table | ENUMERATED {qam256, qam64LowSE} |
| mcs-TableTransformPrecoder | ENUMERATED {qam256, qam64LowSE} |

MCS without the capability report from the terminal device. For example, when a network mandatorily requires that all the terminal devices should support the first MCS and the second MCS, the network device may determine that the terminal device supports the first MCS and the second MCS by default.

In an embodiment, the network device may determine that the terminal device supports the first MCS and the second MCS by using other information in the capability report.

At block 404, the network device may transmit configuration information regarding a first bandwidth part associated with a first MCS table supporting the first MCS to the terminal device. The first MCS table may be any suitable MCS table only if it comprises the first MCS. The first MCS table may comprise any suitable number of MCS indexes such as 32. Each MCS index may correspond to a specific modulation order, a specific target code rate, and a specific spectral efficiency.

At block 406, the network device may transmit configuration information regarding a second bandwidth part associated with a second MCS table supporting the second MCS to the terminal device. The first MCS table is different from the second MCS table. The second MCS table may be any suitable MCS table only if it comprises the second MCS. The second MCS table may comprise any suitable number of MCS indexes such as 32. Each MCS index may correspond to a specific modulation order, a specific target code rate, and a specific spectral efficiency.

Figure 4B:
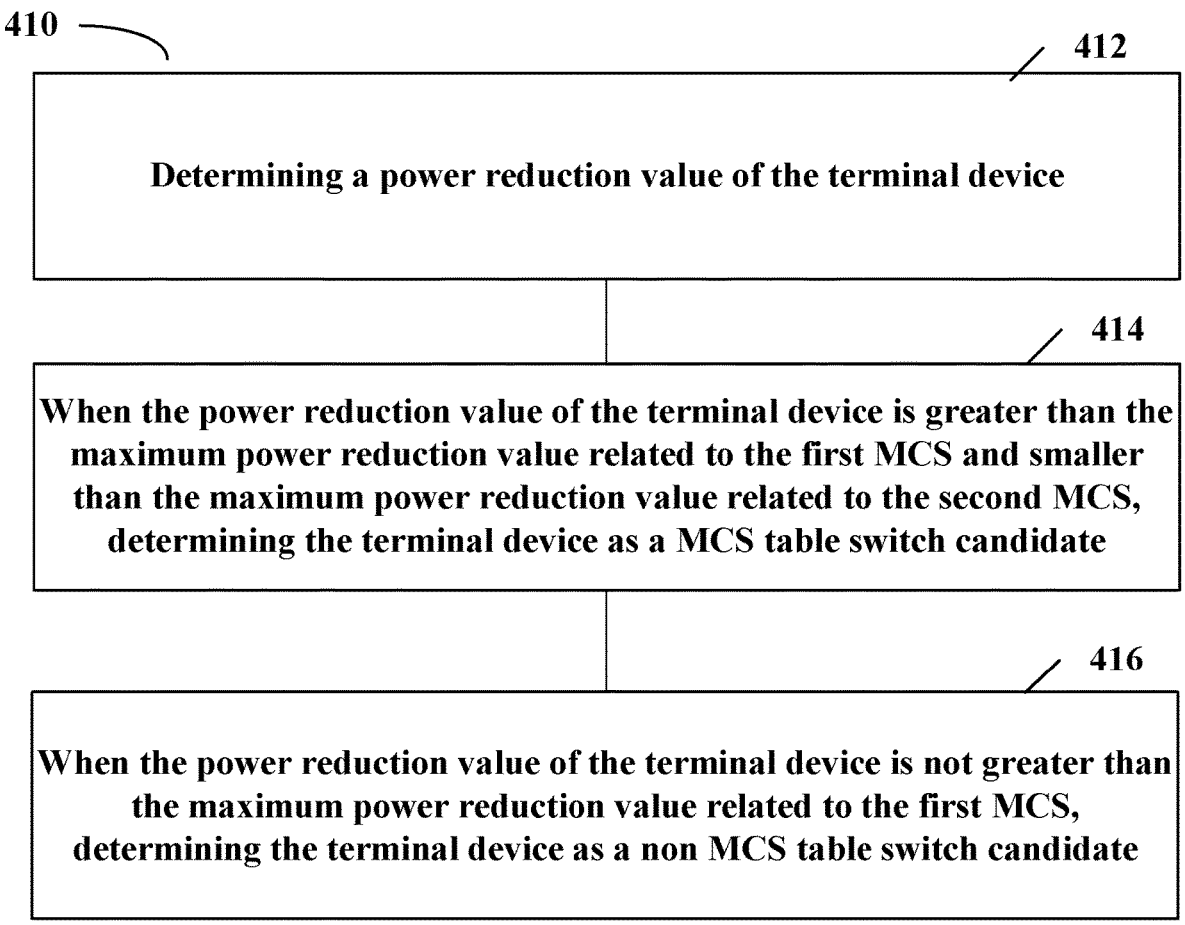
FIG. 4b shows a flowchart of a method according to another embodiment of the present disclosure.

In an embodiment, the first MCS table may be same as Table 5.1.3.1-1 of 3GPP TS 38.214 V16.4.0. In an embodi- FIG. 4b shows a flowchart of a method according to another embodiment of the present disclosure, which may be performed by an apparatus implemented in or at or as a network device or communicatively coupled to the network device. As such, the apparatus may provide means or modules for accomplishing various parts of the method 410 as well as means or modules for accomplishing other processes in conjunction with other components. For some parts which have been described in the above embodiments, the description thereof is omitted here for brevity.

At block 412, the network device may determine a power reduction value of the terminal device. The network device may determine the power reduction value of the terminal device in various ways. For example, the terminal device may report its power reduction value to the network device and then the network device may know the power reduction value of the terminal device. The network device may configure the power reduction value to the terminal device and then the network device may know the power reduction value of the terminal device. The network device may calculate the power reduction value of the terminal device by using some parameters related to power.

In an embodiment, the network device may obtain a power class of the terminal device. The network device may obtain a maximum transmitter power value configured to the terminal device. The network device may obtain a maximum transmitter power value of the terminal device. And then the network device may determine the power reduction value of the terminal device based on the power class of the terminal device, the maximum transmitter power value configured to the terminal device and the maximum transmitter power value of the terminal device.

For example, the terminal device may report its power class to the network device and then the network device may know the power class of the terminal device. The network device may configure the power class to the terminal device and then the network device may know the power class of the terminal device.

For example, the terminal device may report its configured maximum transmitter power value to the network device and then the network device may know the power class of the terminal device. The network device may configure the maximum transmitter power value to the terminal device and then the network device may know the configured maximum transmitter power value of the terminal device.

For example, the terminal device may report its maximum transmitter power value to the network device and then the network device may know the maximum transmitter power value of the terminal device.

The network device such as gNB may get power class from UE capability report. As an example, according to clause 6.3.3 of 3GPP TS 38.331 V16.3.1, UE capability information elements may be used to report the power class information to the network device. For example,

| | |
|---|---|
| BandNR ::= | SEQUENCE { |
| ue-PowerClass | ENUMERATED {pc1, pc2, pc3, pc4} |

The network device such as gNB may calculate the UE power according to PHR report from UE. According to clauses 6.1.3.8 and 6.1.3.9 of 3GPP TS 38.331 V16.3.1, PHR report contains $P_{CMAX,f,c}$ (The configured maximum UE output power for carrier f of serving cell c in each slot) or $P_{CMAX}$ (The configured maximum UE output power). Table 5 shows Multiple Entry PHR MAC (medium access control) CE (control element) with the highest ServCellIndex of Serving Cell with configured uplink is less than 8. Table 5 is same as FIG. 6.1.3.9-1 of 3GPP TS 38.321 V16.3.0.

TABLE 5

| C$_7$ | C$_6$ | C$_5$ | C$_4$ | C$_3$ | C$_2$ | C$_1$ | R |
|---|---|---|---|---|---|---|---|
| P | V | | | PH (Type 2, SpCell of the other MAC entity) | | | |
| R | R | | | $P_{CMAX,f,c}$ 1 | | | |
| P | V | | | PH (Type 1, PCell) | | | |
| R | R | | | $P_{CMAX,f,c}$ 2 | | | |
| P | V | | | PH (Type X, Serving Cell 1) | | | |
| R | R | | | $P_{CMAX,f,c}$ 3 | | | |
| | | | | ... | | | |
| P | V | | | PH (Type X, Serving Cell n) | | | |
| R | R | | | $P_{CMAX,f,c}$ m | | | |

The network device such as gNB may configure P-max to the terminal device such as UE. The P-Max is used to limit the UE's uplink transmission power on a carrier frequency. The configuration of P-max may be motivated by e.g. different regulatory upper EIRP (Effective Isotropic Radiated Power) limits for an operating band in different geographical regions.

As an example, the power reduction value of the terminal device may be determined as min(P-max, Power from power class)-$P_{CMAX}$. For example, UE power class 3, CP-OFDM (Cyclic prefix OFDM (Orthogonal Frequency Division Multiplex)), P-max=23 dB, $P_{CMAX}$=17.5 dB, the max value of 64 QAM MPR=3.5 dB from above Table 1, then the power reduction value of the terminal device may be calculated as P-max-$P_{CMAX}$=23-17.5=5.5 dB.

At block 414, when the power reduction value of the terminal device is greater than the maximum power reduction value related to the first MCS and smaller than the maximum power reduction value related to the second MCS, the network device may determine the terminal device as a MCS table switch candidate.

At block 416, when the power reduction value of the terminal device is not greater than the maximum power reduction value related to the first MCS, the network device may determine the terminal device as a non MCS table switch candidate.

For example, assuming the first MCS is 64 QAM, the second MCS is 256 QAM and modulation is CP-OFDM, a pseudo-code may be as following:

```
if min(P-max, Power from power class)- P_CMAX > max value of 64QAM MPR,
    set the UE to McstableSwitchCandidate group
else
    set the UE to NoMcsTableSwitch group
end
```

In an embodiment, once a UE is in McstableSwitchCandidate group, the UE may be always in the group until the UE is released. The UE can change from the NoMcsTableSwitch group to the McstableSwitchCandidate group. In the above embodiment, the power reduction value of the terminal device=P-max-$P_{CMAX}$=23-17.5=5.5 dB, which is greater than 3.5 dB, i.e., the max value of 64QAM MPR. In other words, the terminal device such as UE determines to backoff transmit power 5.5 dB in 256 QAM area. And this would cause performance problem as described above.

FIG. 4c shows a flowchart of a method according to another embodiment of the present disclosure, which may be performed by an apparatus implemented in or at or as a network device or communicatively coupled to the network device. As such, the apparatus may provide means or modules for accomplishing various parts of the method 420 as well as means or modules for accomplishing other processes in conjunction with other components. For some parts which have been described in the above embodiments, the description thereof is omitted here for brevity.

At block 422, the network device may determine channel quality between the network device and the terminal device. In communication networks for example LTE or NR, there may be various reference signals such as uplink (UL) reference signals and downlink (DL) reference signals. These reference signals can be used to determine channel quality between the network device and the terminal device. The terminal device may send channel state information report to the network device.

At block 424, the network device may transmit a command to the terminal device to switch to the first bandwidth part or the second bandwidth part based on the channel quality between the network device and the terminal device. For example, a specific bandwidth part may be related to at least one channel quality range that the network performance using the specific bandwidth part is higher than the network performance using other bandwidth parts. When the channel quality falls into a channel quality range related to a specific bandwidth part, the network device may transmit the command to the terminal device to switch to that specific bandwidth part.

In an embodiment, the network device may determine that the terminal device is using the second MCS table. When the channel quality between the network device and the terminal device falls into at least one first channel quality range that network performance using the first MCS table is higher than network performance using the second MCS table, the network device may transmit the command to the terminal device to switch to the first bandwidth part. The at least one first channel quality range may be determined in various ways such as simulation, machine learning, big data analysis and mining, etc.

In an embodiment, the first channel quality range may comprise at least one of:
- a channel quality corresponding to the second MCS with a lowest spectral efficiency in the second MCS table, a channel quality corresponding to the second MCS with a second lowest spectral efficiency in the second MCS table, or
- a channel quality corresponding to the first MCS with a highest spectral efficiency in the second MCS table, a channel quality corresponding to the second MCS with a third lowest spectral efficiency in the second MCS table.

In an embodiment, the network device may determine that the terminal device is using the first MCS table. When the channel quality between the network device and the terminal device falls into at least one second channel quality range that network performance using the second MCS table is higher than network performance using the first MCS table, the network device may transmit a command to the terminal device to switch to the second bandwidth part. The at least one second channel quality range may be determined in various ways such as simulation, machine learning, big data analysis and mining, etc.

In an embodiment, the at least one second channel quality range may comprise at least one of:
- a channel quality corresponding to the first MCS with a highest spectral efficiency in the first MCS table, infinity; or
- a channel quality corresponding to the first MCS with a second highest spectral efficiency in the first MCS table, infinity. For example, if UE UL channel quality, FilteredSinr, fulfills formula below, the network device such as gNB may send DCI or RRC reconfiguration to trigger BWP switch to the first bandwidth part supporting the first MCS such as 64 QAM.

Threshold 1<FilteredSinr<Threshold 2 & UE is using the second MCS table supporting the second MCS such as 256 QAM.

If UE UL channel quality, FilteredSinr, fulfills formula below, the network device such as gNB may send DCI or RRC reconfiguration to trigger BWP switch to the second bandwidth part supporting the second MCS such as 256 QAM.

FilteredSinr>Threshold 3 & UE is using the first MCS table supporting the first MCS such as in 64 QAM In an embodiment, the network device such as gNB may set Threshold 1 and Threshold 2 as the channel qualities mapping to the MCS indexes 20 and 21 in Table 4, or the MCS indexes 19-22 which contains the MCS indexes 20 and 21 to get a larger SINR (Signal to Interference plus Noise Ratio) tolerance.

In an embodiment, the network device such as gNB may set Threshold 3 as the channel quality mapping to the MCS index 28 or 27 in Table 3, which means good channel quality enough to support higher modulation.

In an embodiment, the command may be transmitted to the terminal device further based on a prohibition timer. For example, to avoid ping-pang switch, the prohibition timer may be set to enhance the network performance. The prohibition timer may be determined in various ways such as simulation, machine learning, big data analysis and mining, etc.

The command may be transmitted to the terminal device in any suitable message. In an embodiment, the command is transmitted to the terminal device in at least one of downlink control information (DCI); medium access control (MAC) control element (CE); or a radio resource control (RRC) message.

FIG. 5 shows a flowchart of a method according to another embodiment of the present disclosure, which may be performed by an apparatus implemented in or at or as a terminal device or communicatively coupled to the terminal device. As such, the apparatus may provide means or modules for accomplishing various parts of the method 500 as well as means or modules for accomplishing other processes in conjunction with other components. For some parts which have been described in the above embodiments, the description thereof is omitted here for brevity.

At block 502, the terminal device may receive configuration information regarding a first bandwidth part associated with a first modulation and coding scheme (MCS) table supporting the first MCS from the network device. For example, the network device may transmit configuration information regarding the first bandwidth part associated with the first MCS table supporting the first MCS to the terminal device at block 404 of FIG. 4a, and then the terminal device may receive the configuration information.

At block 504, the terminal device may receive configuration information regarding a second bandwidth part associated with a second MCS table supporting the second MCS from the network device. The first MCS table is different from the second MCS table. For example, the network device may transmit configuration information regarding the second bandwidth part associated with the second MCS table supporting the second MCS to the terminal device at block 406 of FIG. 4a, and then the terminal device may receive the configuration information.

Figures 6, 7:
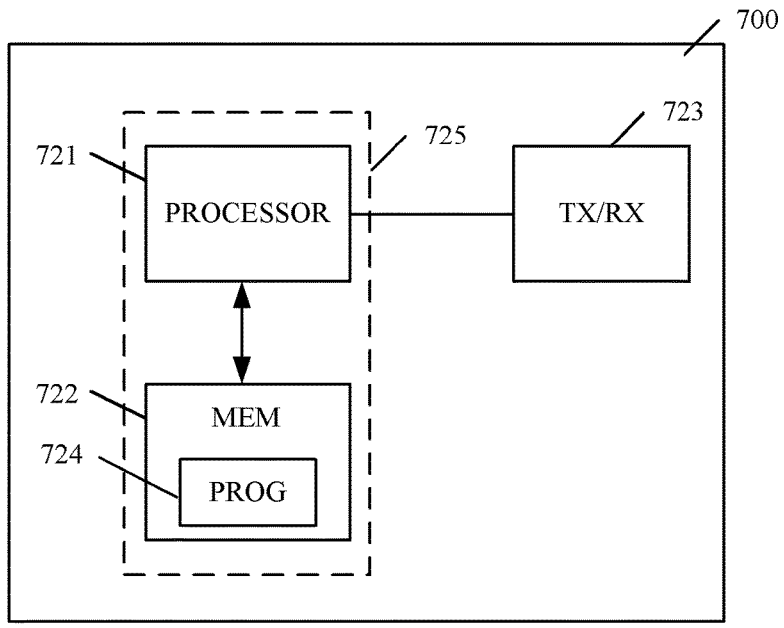
FIG. 6 shows a flowchart of a method according to another embodiment of the present disclosure.
FIG. 7 is a block diagram showing an apparatus suitable for practicing some embodiments of the disclosure.

FIG. 6 shows a flowchart of a method according to another embodiment of the present disclosure, which may be performed by an apparatus implemented in or at or as a terminal device or communicatively coupled to the terminal device. As such, the apparatus may provide means or modules for accomplishing various parts of the method 600 as well as means or modules for accomplishing other processes in conjunction with other components. For some parts which have been described in the above embodiments, the description thereof is omitted here for brevity.

At block 602, the terminal device may receive a command from the network device to switch to the first bandwidth part or the second bandwidth part. For example, the network device may transmit the command to the terminal device at block 424 of FIG. 4c, and then the terminal device may receive the command.

At block 604, the terminal device may switch to the first bandwidth part or the second bandwidth part based on the command.

In an embodiment, the gNB may configure a BWP associated with a MCS table (such as Table 4) supporting 256 QAM to a UE that has the 256 QAM capability in the initial BWP. The gNB may configure another BWP associated with a MCS table (such as Table 3) supporting 64 QAM to the UE. The gNB may calculate the UE transmission power according to the PHR report from the UE, and separate the UE into two groups. One group is for MCS table switch candidates, another group is for No MCS table switch candidates. The gNB may monitor the UE channel quality to decide to switch MCS table by switching BWP in DCI or RRC reconfiguration.

According to various embodiments, the first MCS, the second MCS, the first MCS table, the second MCS table and the channel quality are related to uplink.

FIG. 7 is a block diagram showing an apparatus suitable for practicing some embodiments of the disclosure. For example, any one of the terminal device and the network device described above may be implemented as or through the apparatus 700.

The apparatus 700 comprises at least one processor 721, such as a digital processor (DP), and at least one memory (MEM) 722 coupled to the processor 721. The apparatus 720 may further comprise a transmitter TX and receiver RX 723 coupled to the processor 721. The MEM 722 stores a program (PROG) 724. The PROG 724 may include instructions that, when executed on the associated processor 721, enable the apparatus 720 to operate in accordance with the embodiments of the present disclosure. A combination of the at least one processor 721 and the at least one MEM 722 may form processing means 725 adapted to implement various embodiments of the present disclosure.

Various embodiments of the present disclosure may be implemented by computer program executable by one or more of the processor 721, software, firmware, hardware or in a combination thereof.

The MEM 722 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 721 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the terminal device, the memory 722 contains instructions executable by the processor 721, whereby the terminal device operates according to any of the methods related to the terminal device as described above.

In an embodiment where the apparatus is implemented as or at the network device, the memory 722 contains instructions executable by the processor 721, whereby the network device operates according to any of the methods related to the network device as described above.

Figure 8A:
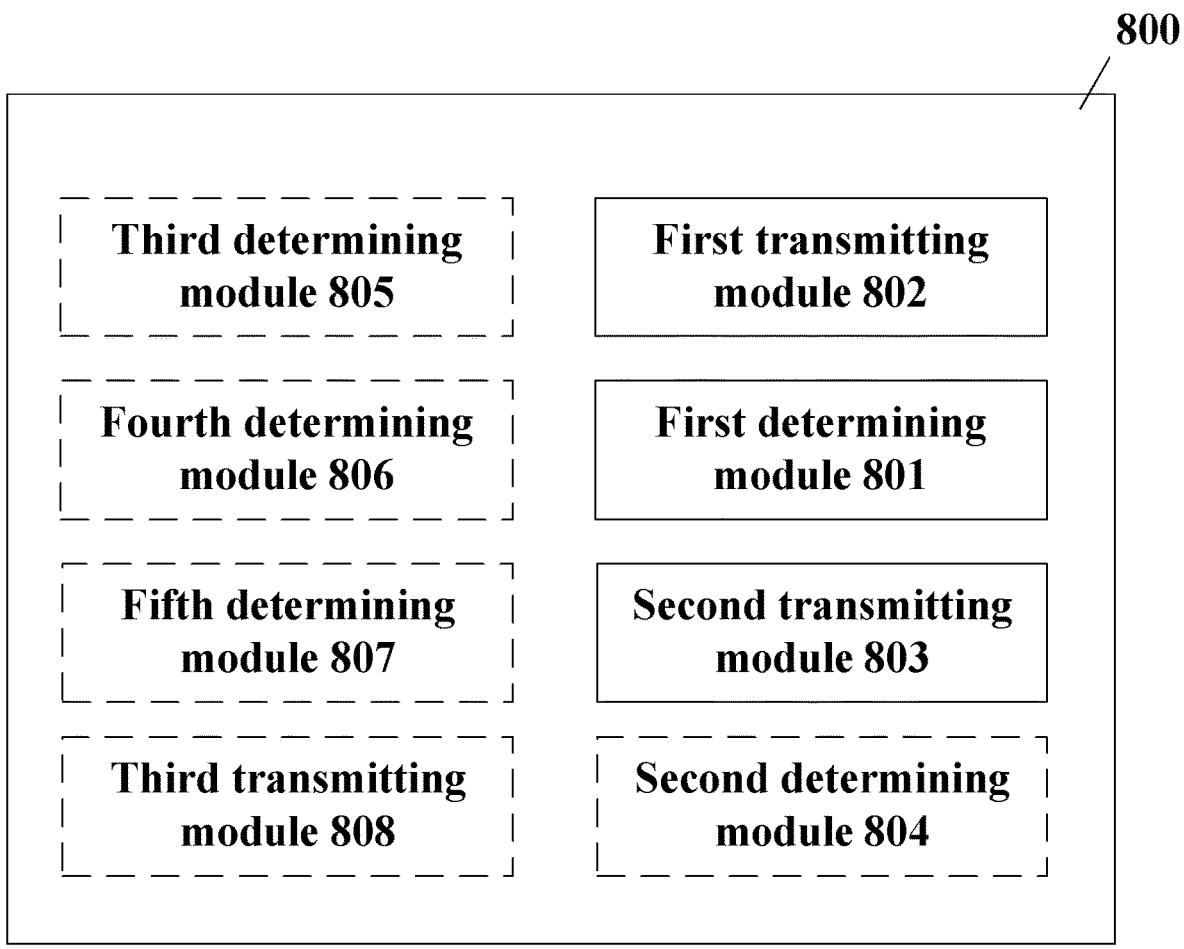
FIG. 8a is a block diagram showing a network device according to an embodiment of the disclosure.

FIG. 8a is a block diagram showing a network device according to an embodiment of the disclosure. As shown, the network device 800 comprises a first determining module 801, a first transmitting module 802 and a second transmitting module 803. The first determining module 801 may be configured to determine that a terminal device supports a first modulation and coding scheme (MCS) and a second MCS. The first transmitting module 802 may be configured to transmit configuration information regarding a first bandwidth part associated with a first MCS table supporting the first MCS to the terminal device. The second transmitting module 803 may be configured to transmit configuration information regarding a second bandwidth part associated with a second MCS table supporting the second MCS to the terminal device. The first MCS table is different from the second MCS table.

In an embodiment, the network device 800 may further comprise a second determining module 804 configured to determine a power reduction value of the terminal device.

In an embodiment, the network device 800 may further comprise a third determining module 805 configured to determine the terminal device as a MCS table switch candidate when the power reduction value of the terminal device is greater than the maximum power reduction value related to the first MCS and smaller than the maximum power reduction value related to the second MCS.

In an embodiment, the network device 800 may further comprise a fourth determining module 806 configured to determine the terminal device as a non MCS table switch candidate when the power reduction value of the terminal device is not greater than the maximum power reduction value related to the first MCS.

In an embodiment, the network device 800 may further comprise a fifth determining module 807 configured to determine channel quality between the network device and the terminal device.

In an embodiment, the network device 800 may further comprise a third transmitting module 808 configured to transmit a command to the terminal device to switch to the first bandwidth part or the second bandwidth part based on the channel quality between the network device and the terminal device.

Figure 8B:
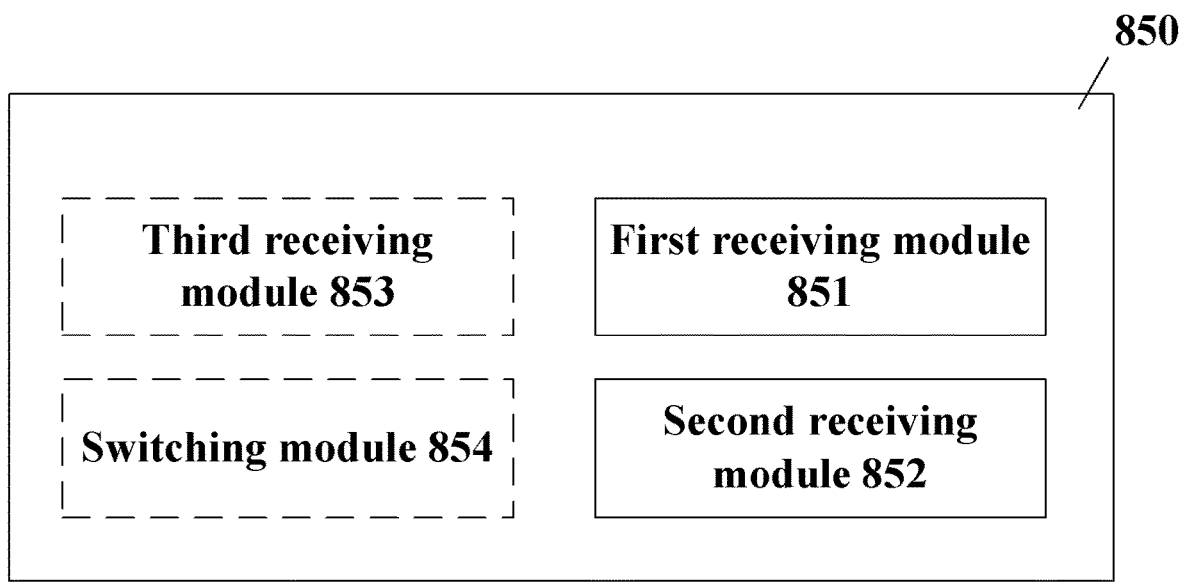
FIG. 8b is a block diagram showing a terminal device according to an embodiment of the disclosure.

FIG. 8b is a block diagram showing a terminal device according to an embodiment of the disclosure. As shown, the terminal device 850 comprises a first receiving module 851 and a second receiving module 852. The first receiving module 851 may be configured to receive configuration information regarding a first bandwidth part associated with a first modulation and coding scheme (MCS) table supporting the first MCS from the network device. The second receiving module 852 may be configured to receive configuration information regarding a second bandwidth part associated with a second MCS table supporting the second MCS from the network device. The first MCS table is different from the second MCS table.

In an embodiment, the terminal device 850 may further comprise a third receiving module 853 configured to receive a command from the network device to switch to the first bandwidth part or the second bandwidth part.

In an embodiment, the terminal device 850 may further comprise a switching module 854 configured to switch to the first bandwidth part or the second bandwidth part based on the command.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the terminal device and the network device may not need a fixed processor or memory, any computing resource and storage resource may be arranged from the terminal device and the network device in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

Further, the exemplary overall commutation system including the terminal device and the network device such as base station will be introduced as below.

Embodiments of the present disclosure provide a communication system including a host computer including: processing circuitry configured to provide user data; and a communication interface configured to forward the user data to a cellular network for transmission to a terminal device. The cellular network includes a base station such as the network device above mentioned, and/or the terminal device is above mentioned.

In embodiments of the present disclosure, the system further includes the terminal device, wherein the terminal device is configured to communicate with the base station.

In embodiments of the present disclosure, the processing circuitry of the host computer is configured to execute a host application, thereby providing the user data; and the terminal device includes processing circuitry configured to execute a client application associated with the host application.

Embodiments of the present disclosure also provide a communication system including a host computer including: a communication interface configured to receive user data originating from a transmission from a terminal device; a base station. The transmission is from the terminal device to the base station. The base station is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

Figure 9:
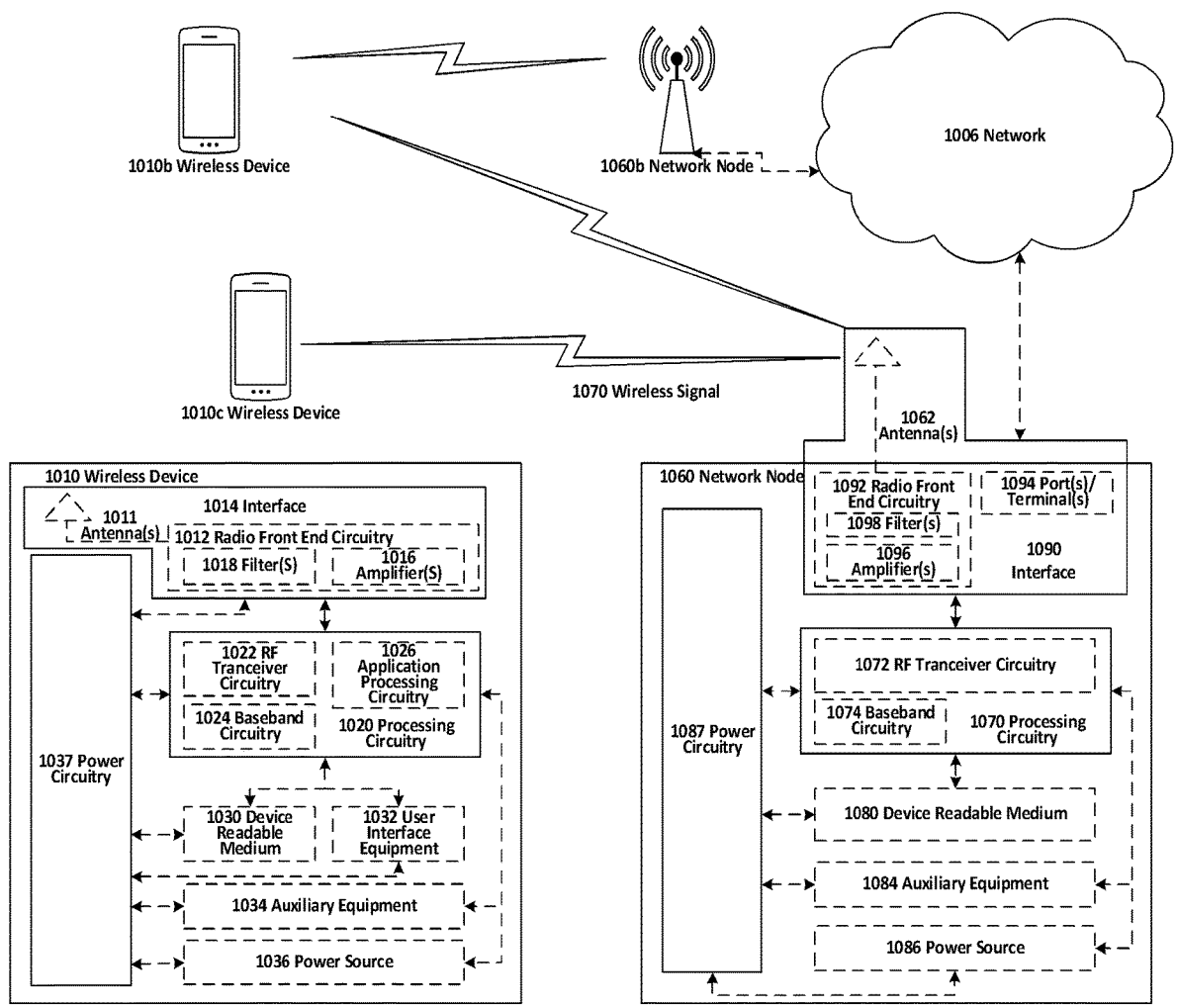
FIG. 9 is a schematic showing a wireless network in accordance with some embodiments.

FIG. 9 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 1006, network nodes 1060 (corresponding to network side node) and 1060b, and WDs (corresponding to terminal device) 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 9 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 10:
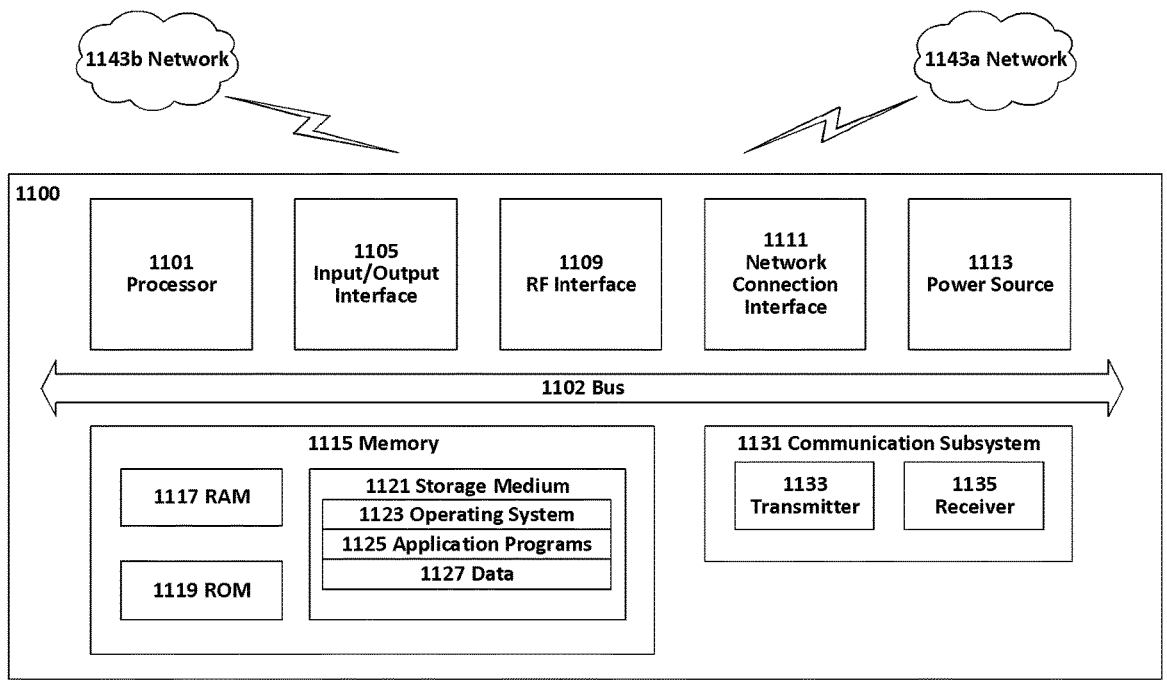
FIG. 10 is a schematic showing a user equipment in accordance with some embodiments.

FIG. 10 is a schematic showing a user equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 10, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 11:
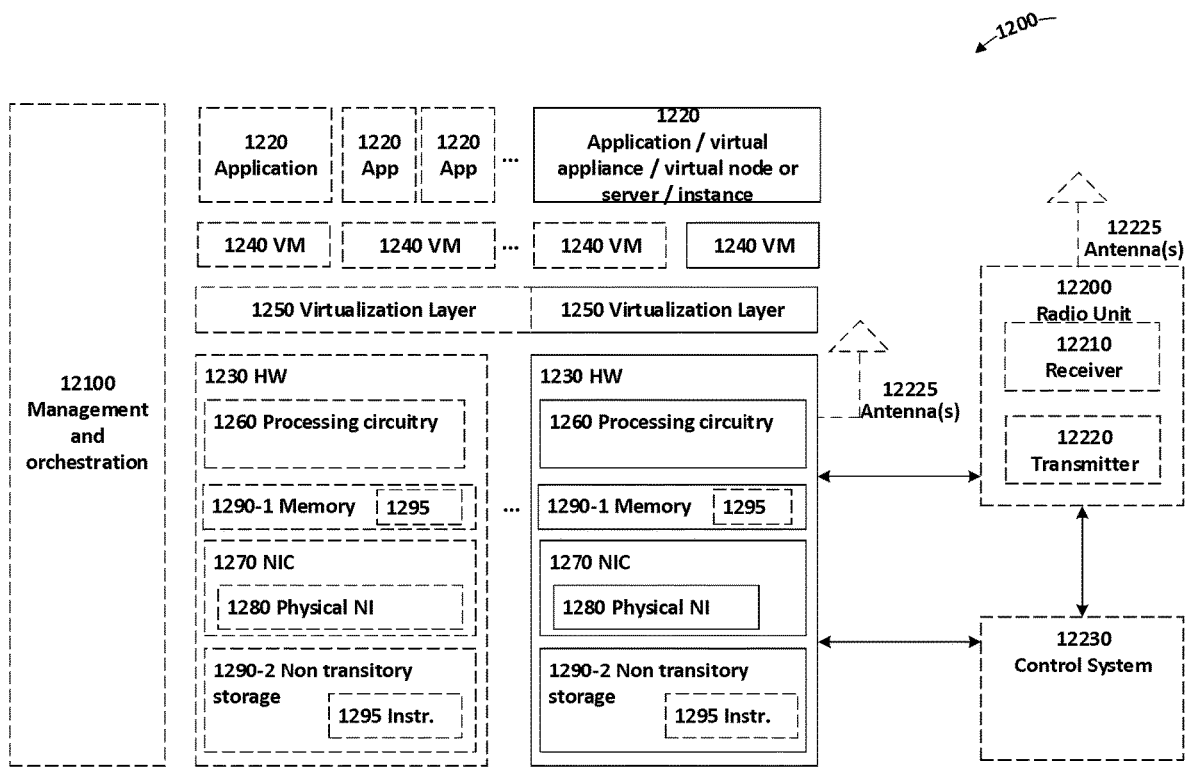
FIG. 11 is a schematic showing a virtualization environment in accordance with some embodiments.

FIG. 11 is a schematic showing a virtualization environment in accordance with some embodiments.

FIG. 11 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 11, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 11.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 12:
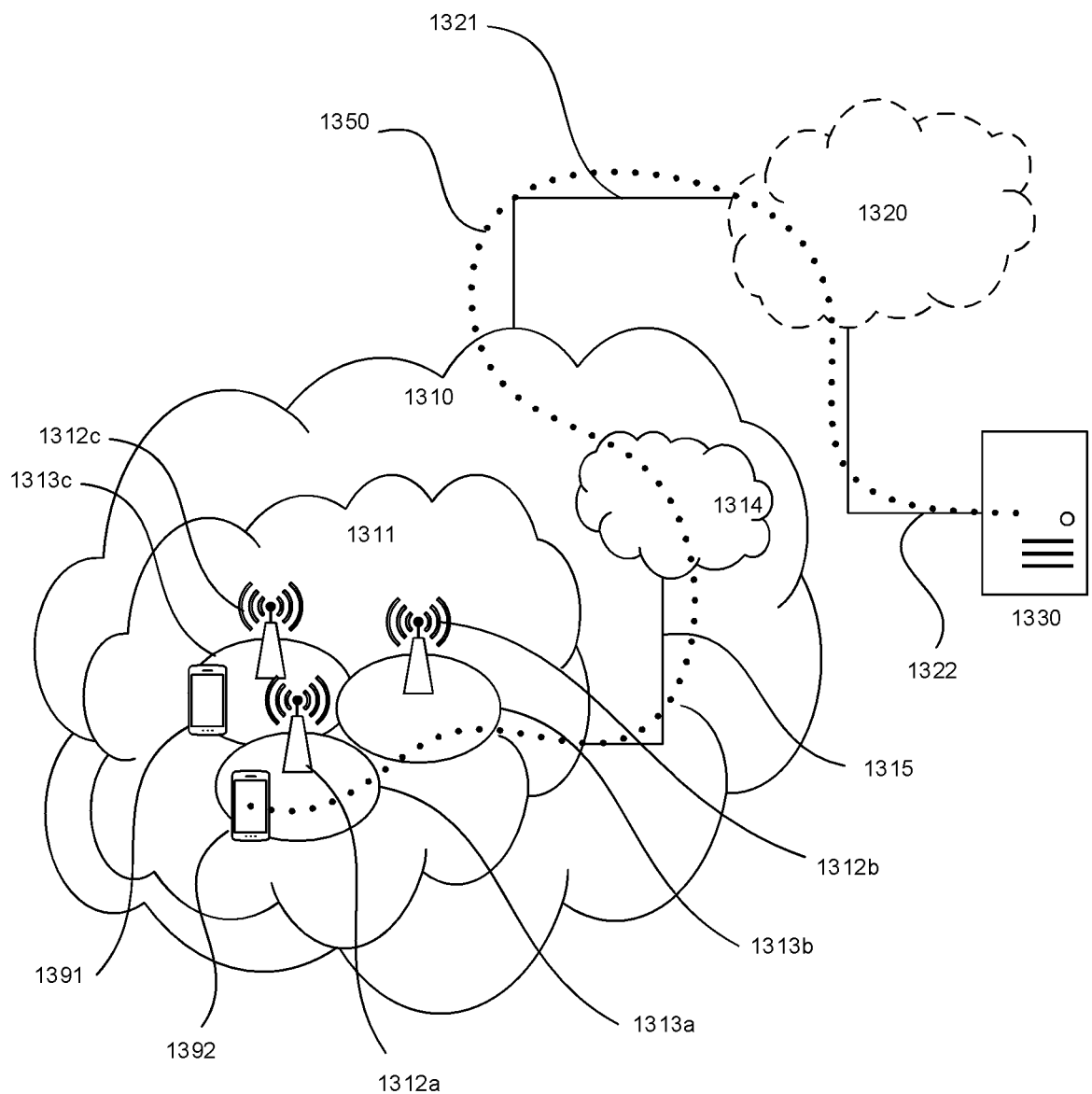
FIG. 12 is a schematic showing a telecommunication network connected via an intermediate network to a host computer in accordance with some embodiments.

FIG. 12 is a schematic showing a telecommunication network connected via an intermediate network to a host computer in accordance with some embodiments.

With reference to FIG. 12, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NB s, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 12 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signalling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 13:
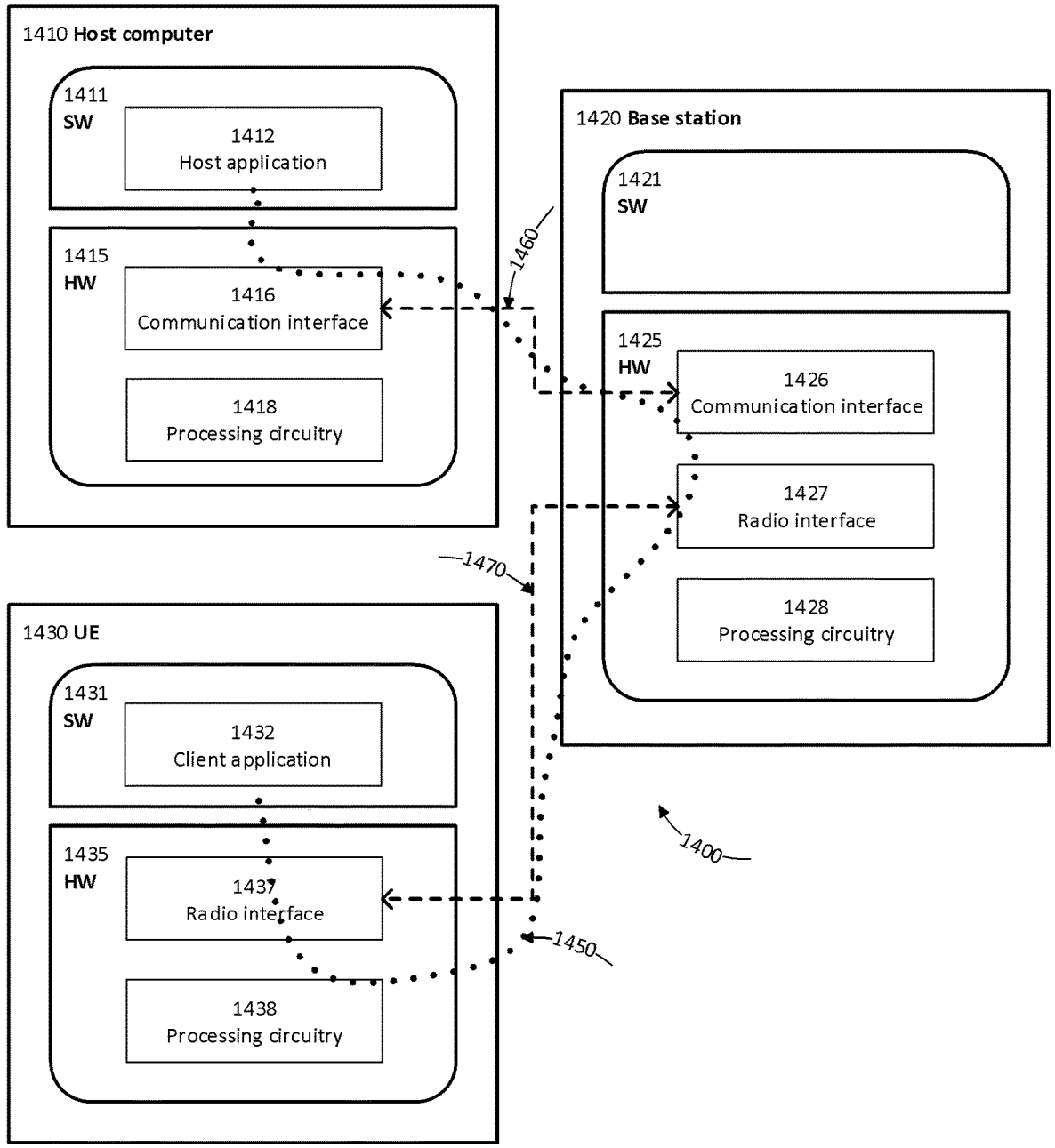
FIG. 13 is a schematic showing a host computer communicating via a base station with a user equipment over a partially wireless connection in accordance with some embodiments.

FIG. 13 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 13) served by base station 1420. Communication interface 1426 may be configured to facilitate connection 1460 to host computer 1410. Connection 1460 may be direct or it may pass through a core network (not shown in FIG. 13) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 13 may be similar or identical to host computer 1330, one of base stations 1312*a*, 1312*b*, 1312*c* and one of UEs 1391, 1392 of FIG. 12, respectively. This is to say, the inner workings of these entities may be as shown in FIG. 13 and independently, the surrounding network topology may be that of FIG. 12.

In FIG. 13, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signalling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 14:
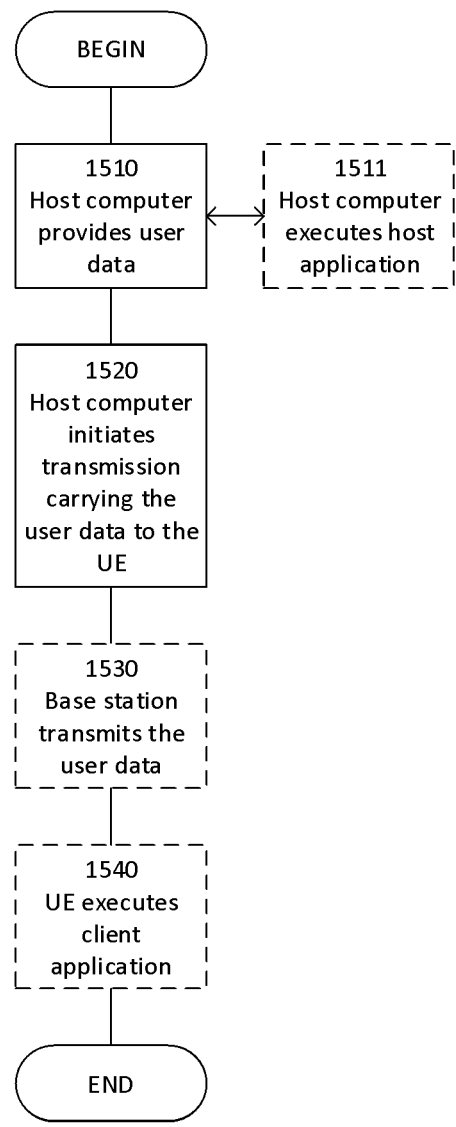
FIG. 14 is a schematic showing methods implemented in a communication system including a host computer, a base station and a user equipment in accordance with some embodiments.

FIG. 14 is a schematic showing methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 15:
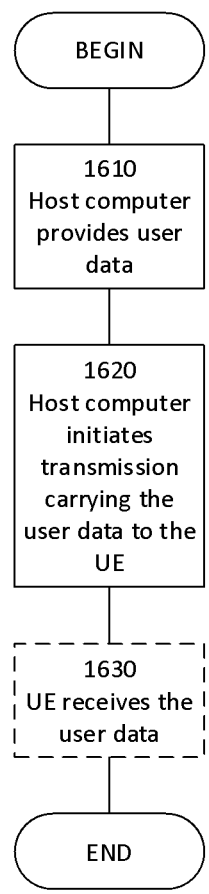
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 16:
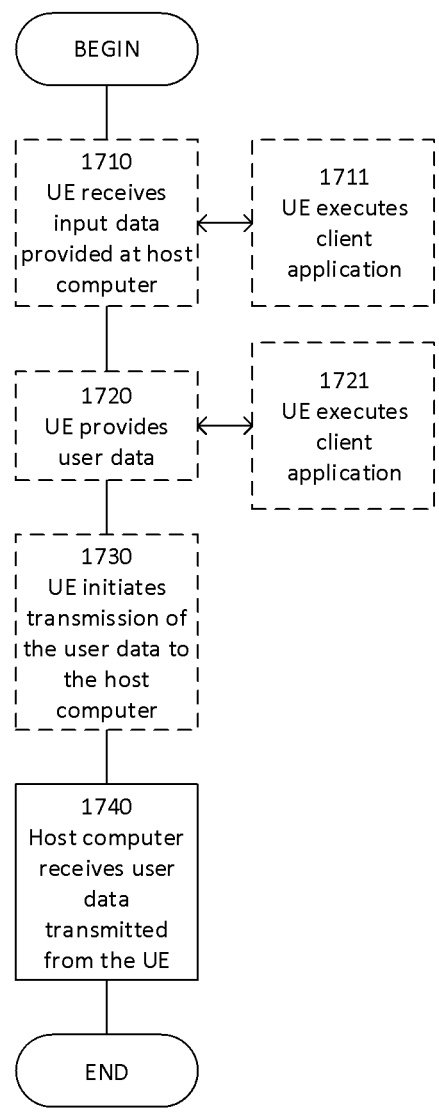
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 17:
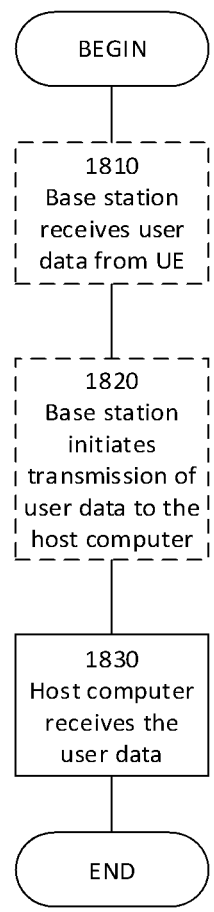
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a network device, the method comprising:
   determining that a terminal device supports a first modulation and coding scheme (MCS) and a second MCS;
   transmitting to the terminal device configuration information regarding a first bandwidth part associated with a first MCS table supporting the first MCS;
   transmitting to the terminal device configuration information regarding a second bandwidth part associated with a second MCS table supporting the second MCS, the first MCS table being different from the second MCS table;
   determining a power reduction value of the terminal device;
   when the power reduction value of the terminal device is greater than the maximum power reduction value related to the first MCS and smaller than the maximum power reduction value related to the second MCS, determining the terminal device as a MCS table switch candidate; and
   when the power reduction value of the terminal device is not greater than the maximum power reduction value related to the first MCS, determining the terminal device as a non MCS table switch candidate.

2. The method of claim 1, wherein determining the power reduction value of the terminal device comprises:
   obtaining a power class of the terminal device;
   obtaining a maximum transmitter power value configured to the terminal device;
   obtaining a maximum transmitter power value of the terminal device; and
   determining the power reduction value of the terminal device based on the power class of the terminal device, the maximum transmitter power value configured to the terminal device and the maximum transmitter power value of the terminal device.

3. The method of claim 1, further comprising:
   determining channel quality between the network device and the terminal device; and
   transmitting a command to the terminal device to switch to the first bandwidth part or the second bandwidth part based on the channel quality between the network device and the terminal device.

4. The method of claim 3, wherein transmitting a command to the terminal device to switch to the first bandwidth part or the second bandwidth part based on the channel quality between the network device and the terminal device comprises:
   determining that the terminal device is using the second MCS table; and when the channel quality between the network device and the terminal device falls into at least one first channel quality range that network performance using the first MCS table is higher than network performance using the second MCS table, transmitting the command to the terminal device to switch to the first bandwidth part.

5. The method of claim 4, wherein the at least one first channel quality range comprises:
a channel quality corresponding to the second MCS with a lowest spectral efficiency in the second MCS table, a channel quality corresponding to the second MCS with a second lowest spectral efficiency in the second MCS table, and/or
a channel quality corresponding to the first MCS with a highest spectral efficiency in the second MCS table, a channel quality corresponding to the second MCS with a third lowest spectral efficiency in the second MCS table.

6. The method of claim 3, wherein transmitting a command to the terminal device to switch to the first bandwidth part or the second bandwidth part based on the channel quality between the network device and the terminal device comprises:
determining that the terminal device is using the first MCS table; and
when the channel quality between the network device and the terminal device falls into at least one second channel quality range that network performance using the second MCS table is higher than network performance using the first MCS table, transmitting a command to the terminal device to switch to the second bandwidth part.

7. The method of claim 6, wherein the at least one second channel quality range comprises:
a channel quality corresponding to the first MCS with a highest spectral efficiency in the first MCS table; and/or
a channel quality corresponding to the first MCS with a second highest spectral efficiency in the first MCS table.

8. The method of claim 3, wherein the command is transmitted to the terminal device in at least one of:
downlink control information;
medium access control control element; or
a radio resource control message.

9. The method of claim 3, wherein the command is transmitted to the terminal device further based on a prohibition timer.

10. The method of claim 1, wherein the first MCS comprises 64 Quadrature Amplitude Modulation (QAM) and the second MCS comprises 256 QAM.

11. A network device, comprising:
a processor; and
a memory coupled to the processor, the memory containing instructions executable by said processor, wherein the network device is operative to:
determine that a terminal device supports a first modulation and coding scheme (MCS) and a second MCS;
transmit configuration information regarding a first bandwidth part associated with a first MCS table supporting the first MCS to the terminal device; and
transmit configuration information regarding a second bandwidth part associated with the second MCS table supporting the second MCS to the terminal device,
the first MCS table being different from the second MCS table;
determine a power reduction value of the terminal device;
when the power reduction value of the terminal device is greater than the maximum power reduction value related to the first MCS and smaller than the maximum power reduction value related to the second MCS, determine the terminal device as a MCS table switch candidate; and
when the power reduction value of the terminal device is not greater than the maximum power reduction value related to the first MCS, determine the terminal device as a non MCS table switch candidate.

12. The network device according to claim 11, wherein determining the power reduction value of the terminal device comprises:
obtaining a power class of the terminal device;
obtaining a maximum transmitter power value configured to the terminal device;
obtaining a maximum transmitter power value of the terminal device; and
determining the power reduction value of the terminal device based on the power class of the terminal device, the maximum transmitter power value configured to the terminal device and the maximum transmitter power value of the terminal device.

13. The network device according to claim 11, wherein the network device is further operative to:
determine channel quality between the network device and the terminal device; and
transmit a command to the terminal device to switch to the first bandwidth part or the second bandwidth part based on the channel quality between the network device and the terminal device.

14. The network device according to claim 13, wherein transmitting a command to the terminal device to switch to the first bandwidth part or the second bandwidth part based on the channel quality between the network device and the terminal device comprises:
determining that the terminal device is using the second MCS table; and
when the channel quality between the network device and the terminal device falls into at least one first channel quality range that network performance using the first MCS table is higher than network performance using the second MCS table, transmitting the command to the terminal device to switch to the first bandwidth part.

* * * * *